United States Patent
Yang

(10) Patent No.: US 9,537,372 B2
(45) Date of Patent: Jan. 3, 2017

(54) METHOD AND STRUCTURE FOR APPLYING FREQUENCY RESONANCE IN AUTOMOBILE KINETIC POWER GENERATION

(71) Applicant: Yiyong Yang, Shanghai (CN)

(72) Inventor: Yiyong Yang, Shanghai (CN)

(*) Notice: Subject to any disclaimer, the term of this patent is extended or adjusted under 35 U.S.C. 154(b) by 63 days.

(21) Appl. No.: 14/395,225

(22) PCT Filed: Apr. 17, 2013

(86) PCT No.: PCT/CN2013/000443
§ 371 (c)(1),
(2) Date: Oct. 17, 2014

(87) PCT Pub. No.: WO2013/155876
PCT Pub. Date: Oct. 24, 2013

(65) Prior Publication Data
US 2015/0091308 A1    Apr. 2, 2015

(30) Foreign Application Priority Data

Apr. 18, 2012  (CN) .......................... 2012 1 0114580
Apr. 16, 2013  (CN) .......................... 2013 1 0132727

(51) Int. Cl.
*H02K 7/18* (2006.01)
*F03G 7/08* (2006.01)
(Continued)

(52) U.S. Cl.
CPC ............. *H02K 7/1853* (2013.01); *B60G 13/14* (2013.01); *B60G 13/18* (2013.01); *F03G 7/08* (2013.01); *B60G 2300/60* (2013.01)

(58) Field of Classification Search
CPC ......... F03G 7/08; H02K 7/1853; B60G 13/18; B60G 13/14
(Continued)

(56) References Cited

U.S. PATENT DOCUMENTS 627,117 A  *  6/1899  Heen ...................... B60B 1/003
                                                185/39
3,981,204 A  *  9/1976  Starbard ................ B60G 13/14
                                                180/65.31
(Continued)

FOREIGN PATENT DOCUMENTS

CN  101368549 A  2/2009
CN  102642453 A  8/2012
(Continued)

OTHER PUBLICATIONS

International Search Report issued in PCT/CN2013/000443 mailed on Jul. 18, 2013 (6 pages).

*Primary Examiner* — Viet Nguyen
(74) *Attorney, Agent, or Firm* — Osha • Laing LLP

(57) ABSTRACT

A method for applying frequency resonance to electric power generation implemented by using the kinetic energy of a vehicle includes, a sprung vehicle body, through a free vibration at an inherent frequency thereof, exciting a hollow heavy-object supporting plate to have frequency resonance or effective vibration, in which the sprung vehicle body is provided with a vertical elastic system, the hollow heavy-object supporting plate is supported by the sprung vehicle body, also provided with a vertical elastic system, and equipped with a kinetic energy generator, and the inherent frequency of the hollow heavy-object supporting plate is same as or similar to that of the sprung vehicle body; the sprung vehicle body transfers the kinetic energy of vibration to the hollow heavy-object supporting plate and the hollow heavy-object supporting plate resonated by being excited drives the kinetic energy generator arranged on the hollow heavy-object supporting plate to generate electric power.

19 Claims, 3 Drawing Sheets

(51) Int. Cl.
*B60G 13/14* (2006.01)
*B60G 13/18* (2006.01)

(58) Field of Classification Search
USPC .................................................. 290/1 C, 1 R
See application file for complete search history.

(56) References Cited

U.S. PATENT DOCUMENTS

| | | | | |
|---|---|---|---|---|
| 4,032,829 A * | 6/1977 | Schenavar | ............. | B60G 13/14 180/65.31 |
| 4,387,781 A * | 6/1983 | Ezell | ...................... | B60G 13/14 180/65.22 |
| 7,408,266 B2 * | 8/2008 | Yeh | ........................... | B62J 6/10 290/1 A |
| 7,638,889 B2 * | 12/2009 | Yeh | ..................... | H02K 7/1853 290/1 A |
| 7,938,217 B2 * | 5/2011 | Stansbury, III | ........... | F03G 7/08 180/165 |
| 8,018,079 B2 * | 9/2011 | Kelly | ........................ | F03D 5/04 290/1 R |
| 8,102,065 B2 * | 1/2012 | Hobdy | .................... | F03B 13/20 290/1 R |
| 8,278,771 B2 * | 10/2012 | Lai | ......................... | H02K 7/116 180/65.21 |
| 2006/0152009 A1 * | 7/2006 | Wilt | ......................... | F03G 7/08 290/1 R |
| 2010/0117277 A1 * | 5/2010 | Ohta | ...................... | B60G 13/18 267/140.14 |
| 2011/0278856 A1 * | 11/2011 | Jiang | ........................ | F03G 7/08 290/1 C |

FOREIGN PATENT DOCUMENTS

| | | |
|---|---|---|
| CN | 102642454 A | 8/2012 |
| CN | 102644570 A | 8/2012 |

\* cited by examiner

METHOD AND STRUCTURE FOR APPLYING FREQUENCY RESONANCE IN AUTOMOBILE KINETIC POWER GENERATION

CROSS REFERENCE TO RELATED APPLICATIONS

This is a national stage application based on PCT/CN2013/000443, filed on Apr. 17, 2013, which claims priority to Chinese Patent Application No. CN 201310132727.0, filed on Apr. 16, 2013, and Chinese Patent Application No. CN 201210114580.8, filed on Apr. 18, 2012. This application claims the priority of these prior applications and incorporates their disclosures by reference in their entireties.

TECHNICAL FIELD

The invention relates to a method for generating electric power by using the kinetic energy of a vehicle, and particularly relates to a method and a structure for applying frequency resonance to electric power generation implemented by using the kinetic energy of a vehicle.

BACKGROUND ART

At present, well-known methods for generating electric power by using the kinetic energy of vehicles are implemented through the recovery of kinetic energy in the process of braking, and the produced electric energy efficiency thereof is extremely low. The kinetic energy generated when a vehicle is travelling, i.e. the kinetic energy generated by vertical velocity components of vehicle vibration formed by pavement fluctuation in gentle or bumpy pavement environments, is basically not recycled currently, and the generation of heat by friction, caused by an auto shock absorber or a vibration-attenuating leaf spring arranged for avoiding possible adverse effects of vibration on vehicle travelling, just consumes a small amount of the kinetic energy of vibration, but due to the deformation caused by a vibration-attenuating effect achieved by a balloon tire in the process of vehicle traveling, the friction area and frictional resistance between a tread and a pavement are increased, therefore, the price of vibration attenuation of the tire is not only shown in doing work through the frictional resistance so as to consume a large number of kinetic energy of vibration produced in the process of vehicle traveling, but also shown in the important consumption of vehicle driving energy. Existing generators implemented by using vertical kinetic energy in the process of vehicle traveling are fundamentally not enough to drive a mechanical transmission mechanism to continuously do work for enabling the generator to generate electric energy, therefore, the kinetic energy of vibration is consumed and wasted actually. Meanwhile, for existing vehicles, in the aspect of motor drive, directly taking an energy storage battery as a drive is always taken as a main considered direction. But the inconveniences in the carrying, replacing and the like of batteries restrict the development of electric vehicles.

Therefore, if the kinetic energy of vibration generated in the process of vehicle travelling can be effectively used, converted into electric energy which can be recycled in the process of smooth vehicle travelling, and provided for vehicles as a driving energy, the kinetic energy of vehicle vibration can be innovatively used so as to promote the recovery and utilization of energy, and a bran-new energy drive mode can be provided for gasoline-electric hybrid vehicles or blade electric vehicles.

SUMMARY OF THE INVENTION

The invention aims to solve the technical problem of providing a method and a structure for applying frequency resonance to electric power generation implemented by using the kinetic energy of a vehicle, by which defect that the kinetic energy of vibration formed by pavement fluctuation in the process of vehicle travelling is basically not utilized is overcome, and the kinetic energy of vibration generated in the process of vehicle travelling is effectively converted into recyclable electrical energy.

Technical Solution

A method for applying frequency resonance to electric power generation implemented by using the kinetic energy of a vehicle, comprising the following steps that: a sprung vehicle body, through a free vibration at an inherent frequency thereof, excites a hollow heavy-object supporting plate to have frequency resonance or effective vibration, wherein the sprung vehicle body is provided with a vertical elastic system, the hollow heavy-object supporting plate is supported by the sprung vehicle body, also provided with a vertical elastic system, and equipped with a kinetic energy generator, and the inherent frequency of the hollow heavy-object supporting plate is same as or similar to that of the sprung vehicle body; and through the frequency resonance, the sprung vehicle body transfers the kinetic energy of vibration to the hollow heavy-object supporting plate so as to realize the vibration attenuation of the sprung vehicle body, and meanwhile, the hollow heavy-object supporting plate resonated by being excited drives the kinetic energy generator arranged on the hollow heavy-object supporting plate to generate electric power by using the kinetic energy absorbed from the sprung vehicle body and the kinetic energy of vibration of the hollow heavy-object supporting plate.

Further, the kinetic energy generator comprises gears and spur racks, the gears are arranged on a center shaft of the generator, a one-way bearing is nested in each gear, the spur racks are vertically fixed in an axle frame, the gears are in unilateral meshed contact with the spur racks, and when the hollow heavy-object supporting plate provided with the kinetic energy generator is excited by the sprung vehicle body to vibrate upwards and downwards along a direction perpendicular to the fixed spur racks, an acting force existing between the gear and the spur rack enables the gear in which the one-way bearing is nested to generate an equidirectional continuous rotary torsional force to the center shaft through the one-way bearing, and then the torsional force drives the center shaft to rotate continuously, so that the generator generates electric power.

Further, the bottom of the axle frame is fixedly arranged on an axle of the vehicle, and supported by the axle of the vehicle, the axle frame is provided with an optical axis which is perpendicular to the ground and used for guiding, and the hollow heavy-object supporting plate is sleeved on the optical axis by a linear bearing, and vibrates upwards and downwards along the vertical direction of the optical axis so as to absorb the kinetic energy of vibration of the sprung vehicle body.

Further, the vertical elastic system corresponding to the inherent frequency of the sprung vehicle body comprises a vertical elastic system which is used for supporting and arranged between the axle frame and the sprung vehicle body and an upper-lower reverse preloaded tension spring set which is arranged in the vertical direction and respectively connected with the tops and bottoms of the hollow heavy-object supporting plate and the axle frame.

The vertical elastic system arranged between the axle and the sprung vehicle body comprises an air spring, the air spring is arranged at the bottom of the axle frame, and the stiffness of the spring is regulated through air pressure so as to keep the required inherent frequency thereof stable.

The tensions of upper and lower tension springs in the vertically arranged reverse preloaded tension spring set are close or equal to tensions for starting the kinetic energy generator.

Further, the vertical elastic system of the hollow heavy-object supporting plate comprises a vertical elastic system which is arranged on the sprung vehicle body and used for separately supporting the gravity of the hollow heavy-object supporting plate and an upper-lower reverse preloaded tension spring set which is arranged in the vertical direction and respectively connected with the tops and bottoms of the hollow heavy-object supporting plate and the axle frame.

The positions of upper and lower preloaded tension springs connected with the hollow heavy-object supporting plate are positions on the hollow heavy-object supporting plate and separately supported by the vertical elastic system arranged on the sprung vehicle body so as to achieve a stationary state.

Further, multiple gears are arranged, and all arranged on the center shaft of the generator, a one-way bearing with an equidirectional torsional force is nested in each gear, the number of the spur rack is same as that of the gear, and the spur racks are oppositely arranged at certain interval, and respectively unilaterally meshed with corresponding gears.

Further, the center shaft of the generator is also provided with a speed increaser.

A sprung vehicle body of the vehicle is provided with a vertical elastic system, a hollow heavy-object supporting plate supported by the sprung vehicle body is also provided with a vertical elastic system, the inherent frequency of the vertical elastic system of the hollow heavy-object supporting plate is set to be same as or close to the inherent frequency of the vertical elastic system of the sprung vehicle body, the hollow heavy-object supporting plate is provided with a kinetic energy generator, the kinetic energy generator comprises gears and spur racks, the gears are arranged on a center shaft of the generator, a one-way bearing is nested in each gear, the spur racks are vertically fixed in an axle frame, the gears are in unilateral meshed contact with the spur racks, and when the hollow heavy-object supporting plate provided with the kinetic energy generator is excited by the sprung vehicle body to vibrate upwards and downwards along a direction perpendicular to the fixed spur racks, an acting force existing between the gear and the spur rack enables the gear in which the one-way bearing is nested to generate an equidirectional continuous rotary torsional force to the center shaft through the one-way bearing, and then the torsional force drives the center shaft to rotate continuously, so that the generator generates electric power.

Further, the bottom of the axle frame is fixedly arranged on an axle of the vehicle, and supported by the axle of the vehicle, an optical axis which is perpendicular to the ground and used for guiding is arranged between the top surface and bottom surface of the axle frame, and the hollow heavy-object supporting plate is sleeved on the optical axis by a linear bearing, and vibrates upwards and downwards along the vertical direction of the optical axis so as to absorb the kinetic energy of vibration of the sprung vehicle body.

Further, multiple gears are arranged, and all arranged on the center shaft of the generator, a one-way bearing with an equidirectional torsional force is nested in each gear, the number of the spur rack is same as that of the gear, and the spur racks are oppositely arranged at certain interval, and respectively unilaterally meshed with corresponding gears.

Further, the vertical elastic system corresponding to the inherent frequency of the sprung vehicle body comprises a vertical elastic system which is used for supporting and arranged between the axle frame and the sprung vehicle body and an upper-lower reverse preloaded tension spring set which is arranged in the vertical direction and respectively connected with the tops and bottoms of the hollow heavy-object supporting plate and the axle frame.

The vertical elastic system used for supporting and arranged between the axle frame and the sprung vehicle body comprises an air spring arranged between the axle and the sprung vehicle body.

The upper-lower reverse preloaded tension spring set arranged in the vertical direction comprises an upper tension spring and a lower tension spring, the upper tension spring is connected with the tops of the hollow heavy-object supporting plate and the axle frame, the lower tension spring is connected with the bottoms of the hollow heavy-object supporting plate and the axle frame, the upper tension spring and the lower tension spring are connected by a vertical mesh rack, then the vertical mesh rack is meshed with a lateral mesh rack, and the lateral mesh rack is vertically fixed on the side face of the hollow heavy-object supporting plate.

Further, the vertical elastic system of the hollow heavy-object supporting plate comprises a vertical elastic system which is arranged on the sprung vehicle body and used for separately supporting the gravity of the hollow heavy-object supporting plate and an upper-lower reverse preloaded tension spring set which is arranged in the vertical direction and respectively connected with the tops and bottoms of the hollow heavy-object supporting plate and the axle frame The vertical elastic system arranged on the sprung vehicle body and used for separately supporting the gravity of the hollow heavy-object supporting plate adopts a support spring arranged on the sprung vehicle body.

Or, the vertical elastic system arranged on the sprung vehicle body and used for separately supporting the gravity of the hollow heavy-object supporting plate adopts a support box arranged on the sprung vehicle body and formed by vertical support frames, and the top end of the support box and the hollow heavy-object supporting plate are connected in suspended connection mode by using a tension spring.

Further, the upper-lower reverse preloaded tension spring set of the hollow heavy-object supporting plate and the upper-lower reverse preloaded tension spring set of the sprung vehicle body are the same one.

Further, the structure for generating electric power by using the kinetic energy of a vehicle is arranged at the positions of the front end and rear end of a vehicle body of a heavy-duty lorry, a super-capacitor or battery is taken as an energy storage power supply, and buffer blocks fixedly arranged at certain interval on the surface of a hub metal rim of a wheel are taken as a hard tire tread.

Advantageous Effects

According to the method and structure for applying frequency resonance to electric power generation implemented by using the kinetic energy of a vehicle disclosed by the invention, through a frequency resonance method, the kinetic energy of vibration of the vehicle body is transferred to the kinetic energy generator so as to achieve the vibration attenuating effect of the vehicle body (a shock absorber and a leaf spring are canceled), and the kinetic energy generator can absorb the kinetic energy of vibration of the vehicle body to have resonance and generate electric energy, so that the kinetic energy is transferred into utilizable electric energy; and the electric energy after being stored can be directly used as an electric drive energy, and also can reduce the consumption of fuel oil and the emission of exhaust gas in a hybrid power mode of power utilization and high-speed gasoline utilization under the conditions of starting acceleration and low speed (low power consumption, high torque), so that the energy consumption of the vehicle is greatly improved.

Figure 1:
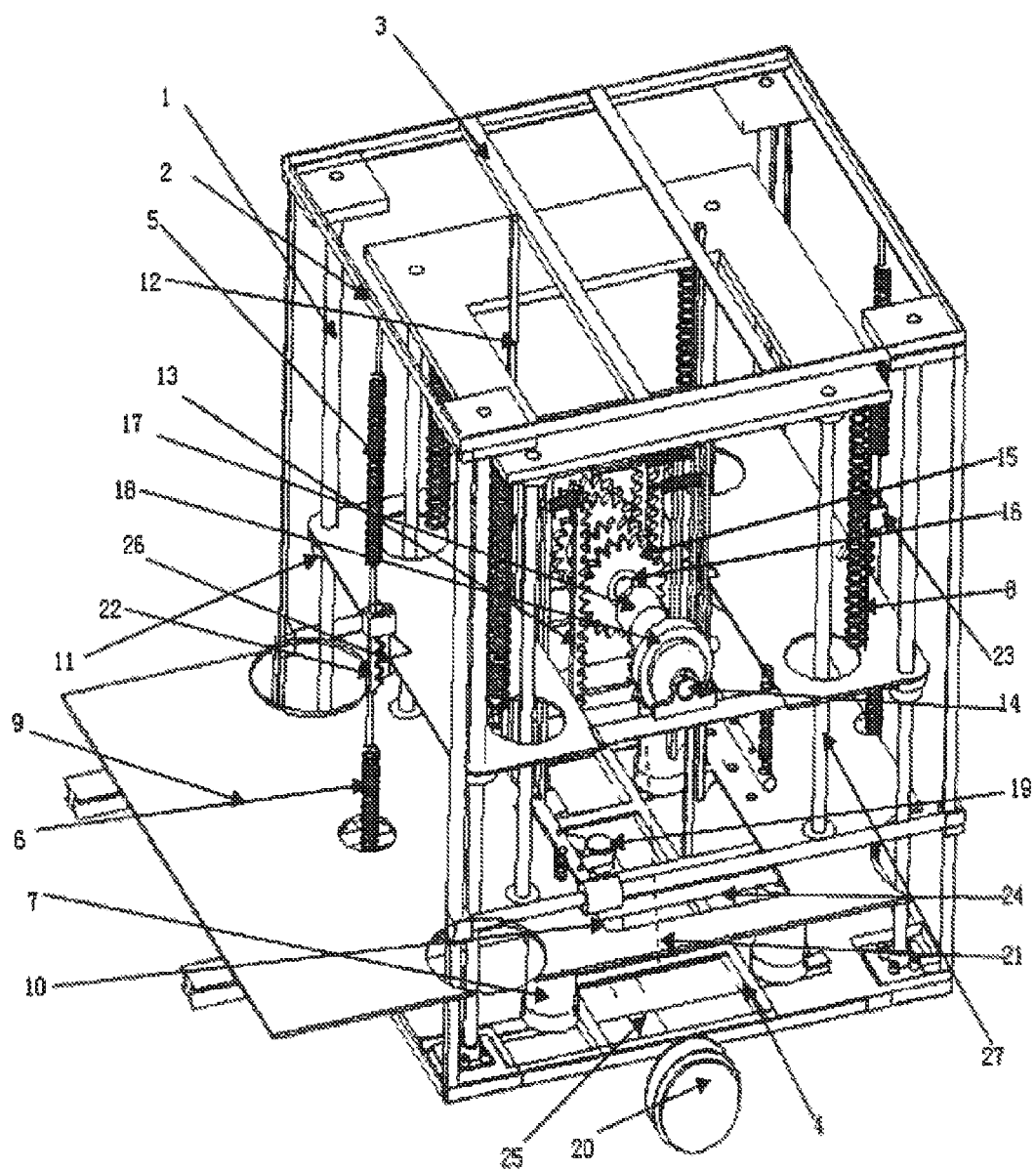
FIG. 1 is a structural schematic diagram of the invention.
Figure 2:
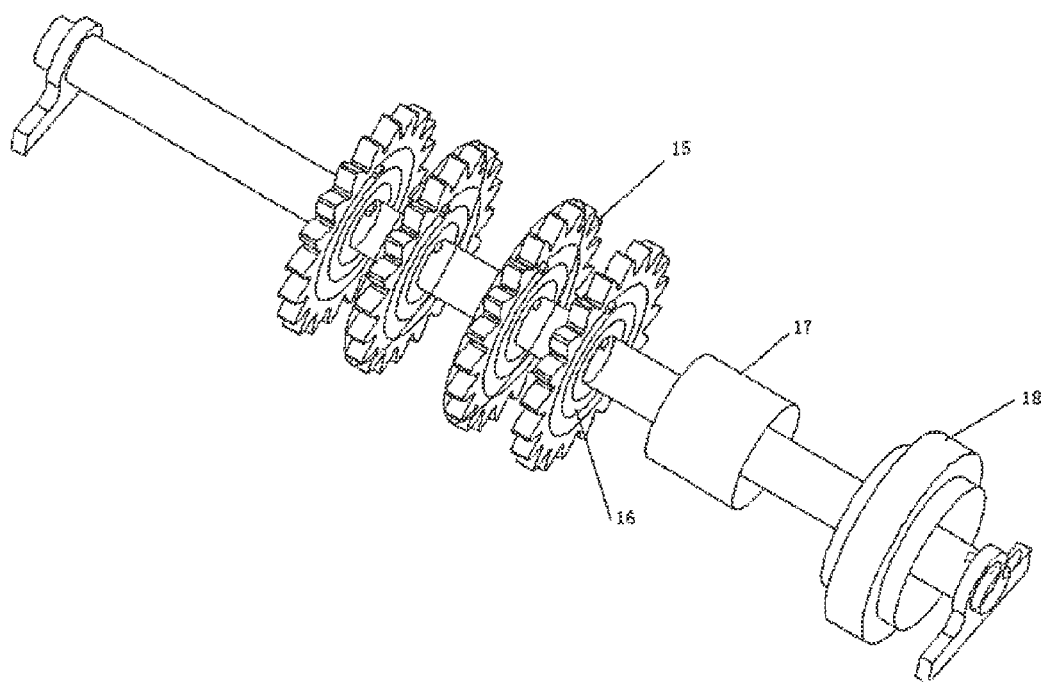
FIG. 2 is a partial amplified schematic diagram of the center shaft of the generator in the invention.
Figure 3:
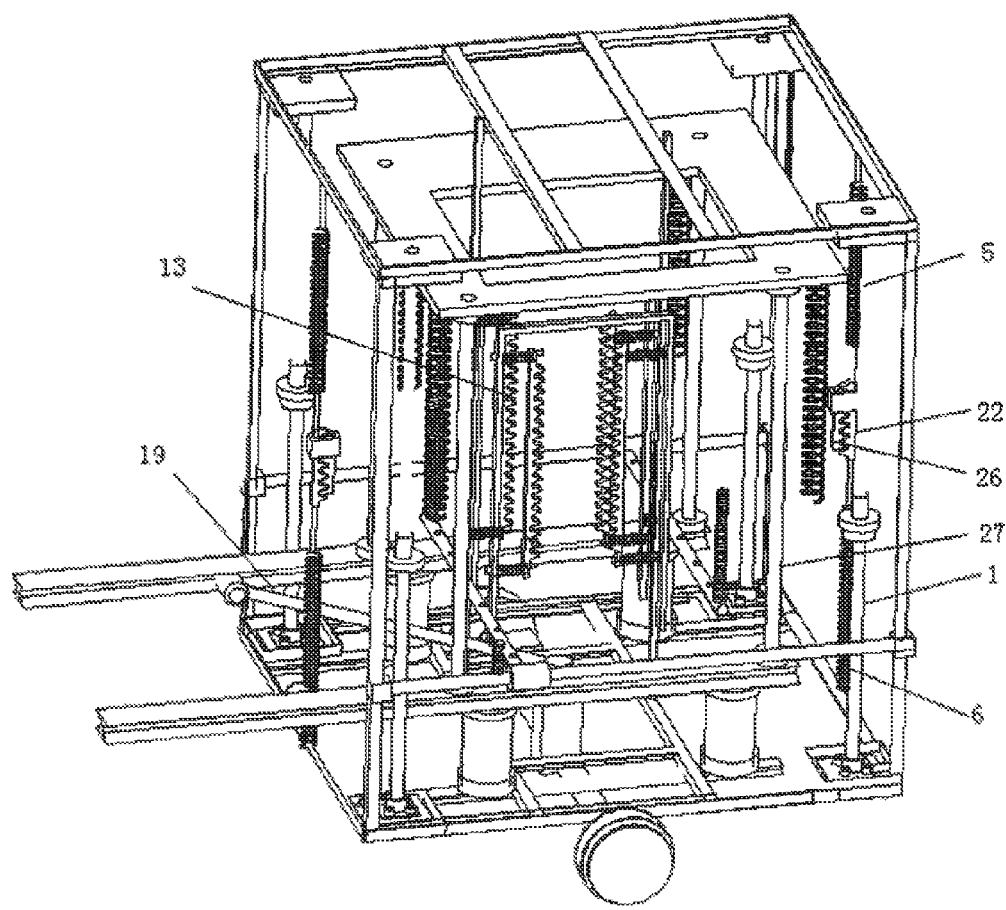
FIG. 3 is a partial amplified schematic diagram of the axle frame and the vertical elastic system in the invention.

wherein: 1—optical axis, 2—axle frame, 3—upper axle support frame, 4—lower axle support frame, 5—upper preloaded tension spring, 6—lower preloaded tension spring, 7—support spring for a sprung vehicle body, 8—tension spring for a hollow heavy-object supporting plate, 9—sprung vehicle body, 10—vibration sensor, 11—linear bearing, 12—spur rack support frame, 13—spur rack, 14—center shaft, 15—gear, 16—one-way bearing, 17—speed increaser, 18—generator, 19—thrust rod, 20—hub motor wheel, 21—driving-force steel wire rope, 22—lateral mesh rack, 23—mesh rack bracelet, 24—frame for the sprung vehicle body, 25—axle, 26—vertical mesh rack, 27—support frame for the tension spring for the hollow heavy-object supporting plate

DETAILED DESCRIPTIONS OF THE PREFERRED EMBODIMENTS

The following further describes the invention with reference to the embodiments and accompanying drawings.

The analysis on the kinetic energy of vibration generated in the process of vehicle travelling shows that in the process of vehicle bumpiness and vibration, the kinetic energy generated by vertical velocity components of the vehicle is basically not utilized currently, so for rationally and efficiently utilizing the kinetic energy of vibration in the vertical direction, the invention provides a method for applying frequency resonance to electric power generation implemented by using the kinetic energy of a vehicle, which is implemented through that: a sprung vehicle body, through a free vibration at an inherent frequency thereof, excites a hollow heavy-object supporting plate to have frequency resonance or effective vibration, wherein the sprung vehicle body is provided with a vertical elastic system, the hollow heavy-object supporting plate is supported by the sprung vehicle body, also provided with a vertical elastic system, and equipped with a kinetic energy generator, and the inherent frequency of the hollow heavy-object supporting plate is same as or similar to that of the sprung vehicle body; and through the frequency resonance, the sprung vehicle body transfers the kinetic energy of vibration to the hollow heavy-object supporting plate so as to realize the vibration attenuation of the sprung vehicle body, and meanwhile, the hollow heavy-object supporting plate resonated by being excited drives the kinetic energy generator arranged on the hollow heavy-object supporting plate to generate electric power by using the kinetic energy absorbed from the sprung vehicle body and the kinetic energy of vibration of the hollow heavy-object supporting plate.

The free vibration of the sprung vehicle body at an inherent frequency thereof, which is randomly excited by a pavement when an electric vehicles travels, refers to non-energy-consumption free vibration implemented without vibration attenuation by using a shock absorber and frictional vibration attenuation by using a leaf spring.

The hollow heavy-object supporting plate refers to that a hollow supporting plate is provided with a kinetic energy generator and a heavy-object box which can fixedly accommodate heavy-objects such as energy storage batteries and the like.

The principle of the method disclosed by the invention is to transfer the kinetic energy of vibration generated by that the sprung vehicle body of the vehicle is randomly excited by pavements to the hollow heavy-object supporting plate through the frequency resonance between the hollow heavy-object supporting plate supported by the sprung vehicle body and the sprung vehicle body, and carry out electric power generation by using the kinetic energy generator on the hollow heavy-object supporting plate.

FIG. 1 shows a structure designed according to the method, wherein the bottom of the axle frame supported by the axle of the vehicle is fixedly arranged on the axle of the vehicle, the top surface of the axle frame is provided with the upper axle support frame, the bottom surface of the axle frame is provided with the lower axle support frame, the top surface and bottom surface of the axle frame are parallel to the ground, the optical axis perpendicular to the ground and used for guiding is arranged between the top surface and bottom surface of the axle frame, and the hollow heavy-object supporting plate is sleeved on the optical axis through the linear bearing, and vibrates upwards and downwards along the vertical direction of the optical axis so as to absorb the kinetic energy of vibration of the sprung vehicle body;

The sprung vehicle body of the vehicle is provided with a vertical elastic system which comprises an air spring arranged between the axle and the sprung vehicle body and an upper-lower reverse preloaded tension spring set arranged in the vertical direction and respectively connected with the tops and bottoms of the hollow heavy-object supporting plate and the axle frame;

The hollow heavy-object supporting plate is also provided with a vertical elastic system which comprises a vertical elastic system and an upper-lower reverse preloaded tension spring set, wherein the vertical elastic system is arranged on the sprung vehicle body and used for separately supporting the gravity of the hollow heavy-object supporting plate, the vertical elastic system adopts a support box arranged on the sprung vehicle body and formed by vertical support frames, and the top end of the support box and the hollow heavy-object supporting plate are connected in suspended connection mode by using a tension spring; and the upper-lower reverse preloaded tension spring set of the hollow heavy-object supporting plate and the upper-lower reverse preloaded tension spring set of the sprung vehicle body are the same one;

Through the respective design and control on the stiffness of the two vertical elastic systems, the inherent frequency of the hollow heavy-object supporting plate is kept to be same as or close to the vibration frequency of the sprung vehicle body of the electric vehicle in the process of travelling, and a driving-force steel wire rope can be added between the sprung vehicle body and the hollow heavy-object supporting plate so as to facilitate a driving effect of the sprung vehicle body on the hollow heavy-object supporting plate when the vehicle starts.

The hollow heavy-object supporting plate is provided with a kinetic energy generator, the kinetic energy generator comprises gears and spur racks, the gears are arranged on a center shaft of the generator, a one-way bearing is nested in each gear, the spur racks are vertically fixed in the axle frame, the gears are in unilateral meshed contact with the spur racks, and when the hollow heavy-object supporting plate provided with the kinetic energy generator is excited by the sprung vehicle body to vibrate upwards and downwards along a direction perpendicular to the fixed spur racks, an acting force existing between the gear and the spur rack enables the gear in which the one-way bearing is nested to generate an equidirectional continuous rotary torsional force to the center shaft through the one-way bearing, and then the torsional force drives the center shaft to rotate continuously, so that the generator generates electric power.

The gears and the spur racks are arranged in a one-to-one correspondence mode, a one-way bearing with an equidirectional torsional force is nested in each gear, and the spur racks are respectively oppositely arranged at certain interval, and unilaterally meshed with corresponding gears.

The vertical elastic system supporting the hollow heavy-object supporting plate also can adopt a support spring (i.e. compressed spring) arranged between the sprung vehicle body and the hollow heavy-object supporting plate.

The air spring comprises a spring and related accessories (i.e. a vibration sensor and a controller), wherein the controller, through the feedback of the vibration sensor, controls the air pressure for regulating the stiffness of the spring so as to keep a required inherent frequency stable.

The upper tension spring and lower tension spring of the upper-lower reverse preloaded tension spring set are connected by using the vertical mesh rack, then the vertical mesh rack is meshed with the lateral mesh rack, and the lateral mesh rack is vertically fixed on the side face of the hollow heavy-object supporting plate, and externally tightly banded with the mesh rack bracelet. The tensions of the preloaded tension springs are set to be close or equal to tensions obtained by taking a start torque for starting the kinetic energy generator as a moment of force and taking the meshed parts of the gears and the spur racks as moment arms, when the hollow heavy-object supporting plate has a low-intensity vibration, the vibratory force thereof is superposed on the tension of the preloaded tension spring in the moving direction so as to trigger the preloaded tension spring to be shortened and then release a tension with an initial tension greater than a preload and capable of enabling the kinetic energy generator to be started, thereby achieving the capture effect on the low-intensity vibratory force of the hollow heavy-object supporting plate and implementing the improvement on the utilization efficiency of the kinetic energy of vibration.

A bottom plate of the sprung vehicle body is required to bypass the optical axis and the vertical support frame for the axle frame, the restricted movable positioning of the sprung vehicle body in the horizontal direction is implemented by the thrust rod in combination with the axle and the frame for the sprung vehicle body, and the vertical support frame for the axle frame and the guide optical axis can pass through the bottom plate of the sprung vehicle body in contactless form by way of arranging open holes or cutting off part of the bottom plate.

Figure 4:
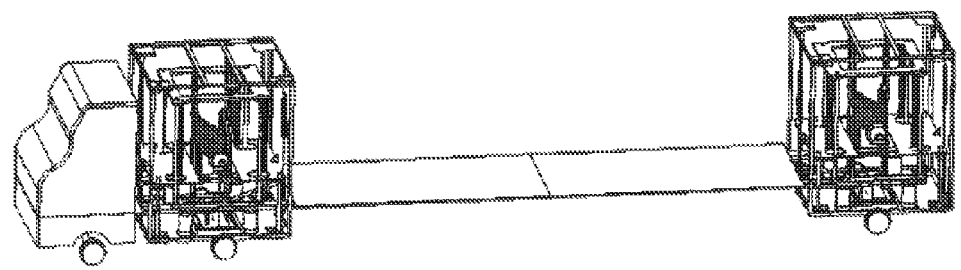
FIG. 4 is a schematic diagram of a general assembly arranged on the vehicle according to the invention.

An installation embodiment of the structure disclosed by the invention on a lorry is shown in FIG. 4, devices of the structure are arranged at the positions of the front end and rear end of a vehicle body of the heavy-duty lorry, a super-capacitor or battery is taken as an energy storage power supply, the lorry is equipped with an all-air actively controlled rigid axle suspension, and gasoline-electric hybrid power is adopted, so that electric energy self-generation under all road conditions can be realized and a range extended effect of casual electric energy charge and discharge controlled as required can be achieved, and the energy recovery efficiency is greatly increased in comparison with that caused by braking.

Some heavy-duty lorries adopts solid rubber tires for bearing and vibration attenuation, and for avoiding that the tires are punctured because of rubbing against the ground when the lorries travel at high speed, the travelling speeds of the lorries are mostly limited. Therefore, a tire can adopt buffer blocks non-integrally and fixedly arranged at certain interval on the surface of a hub metal rim of an existing wheel as a hard wheel-tire tread of the wheel contacted with the ground.

In the installation embodiment of the structure on a lorry shown in FIG. 4, the sprung vehicle body provided with frequency-resonated kinetic energy generators both can be arranged in a trailer mode that the sprung vehicle body is arranged at the two ends of a trailer by being towed by a towing vehicle, and can be arranged in a mode that one of the frequency-resonated kinetic energy generators is arranged at the rear end of a cab.

The method and structure disclosed by the invention not only innovatively utilize the kinetic energy of vehicle vibration, promote the recovery and utilization of energy, reduce the consumption of fuel oil and the emission of exhaust gas, and greatly improve the energy consumption of vehicles, but also provide a bran-new energy drive mode for gasoline-electric hybrid vehicles or blade electric vehicles.

The invention claimed is:

1. A method for applying frequency resonance to electric power generation implemented by using the kinetic energy of a vehicle, comprising the following steps that: a sprung vehicle body, through a free vibration at an inherent frequency thereof,
    exciting a hollow heavy-object supporting plate to have frequency resonance or effective vibration,
    wherein the sprung vehicle body is provided with a first vertical elastic system,
    wherein the hollow heavy object supporting plate is supported by the sprung vehicle body, is provided with a second vertical elastic system, and is equipped with a kinetic energy generator,
    the kinetic energy generator comprising: a center shaft; gears arranged on the center shaft; and spur racks,
        wherein a one-way bearing is nested in each gear,
        wherein the spur racks are vertically fixed in an axle frame,
        wherein the gears are in unilateral meshed contact with the spur racks,
    wherein the inherent frequency of the hollow heavy-object supporting plate is same as or similar to that of the sprung vehicle body; and through the frequency resonance, the sprung vehicle body transfers the kinetic energy of vibration to the hollow heavy-object supporting plate so as to realize the vibration attenuation of the sprung vehicle body, and meanwhile, the hollow heavy-object supporting plate resonated by being excited drives the kinetic energy generator arranged on the hollow heavy-object supporting plate to generate electric power by using the kinetic energy absorbed from the sprung vehicle body and the kinetic energy of vibration of the hollow heavy-object supporting plate, and wherein when the hollow heavy-object supporting plate provided with the kinetic energy generator is excited by the vehicle body to vibrate upwards and downwards along a direction perpendicular to the fixed spur racks, an acting force existing between the gear and the spur rack enables the gear in which the one-way bearing is nested to generate an equidirectional continuous rotary torsional force to the center shaft through the one-way bearing, and then the torsional force drives the center shaft to rotate continuously, so that the generator generates electric power.

2. The method for applying frequency resonance to electric power generation implemented by using the kinetic energy of a vehicle according to claim 1,
wherein a bottom of the axle frame is fixedly arranged on an axle of the vehicle, and is supported by the axle of the vehicle,
wherein the axle frame is provided with an optical axis, which is perpendicular to the ground and used for guiding, and
wherein the hollow heavy-object supporting plate is sleeved on the optical axis by a linear bearing, and vibrates upwards and downwards along a vertical direction of the optical axis so as to absorb the kinetic energy of vibration of the sprung vehicle body.

3. The method for applying frequency resonance to electric power generation implemented by using the kinetic energy of a vehicle according to claim 1, wherein the first vertical elastic system corresponding to the inherent frequency of the sprung vehicle body is arranged between the axle frame and the sprung vehicle body and an upper-lower reverse preloaded tension spring set, which is arranged in a vertical direction and is respectively connected with tops and bottoms of the hollow heavy-object supporting plate and the axle frame.

4. The method for applying frequency resonance to electric power generation implemented by using the kinetic energy of a vehicle according to claim 3,
wherein the first vertical elastic system arranged between the axle frame and the sprung vehicle body comprises an air spring, and
wherein the air spring is arranged at the bottom of the axle frame, and a stiffness of the air spring is regulated through air pressure so as to keep the required inherent frequency thereof stable.

5. The method for applying frequency resonance to electric power generation implemented by using the kinetic energy of a vehicle according to claim 3, wherein tensions of upper and lower tension springs in the vertically arranged reverse preloaded tension spring set are close or equal to tensions for starting the kinetic energy generator.

6. The method for applying frequency resonance to electric power generation implemented by using the kinetic energy of a vehicle according to claim 1,
wherein the second vertical elastic system of the hollow heavy-object supporting plate is arranged on the sprung vehicle body and is used for separately supporting a gravity of the hollow heavy-object supporting plate, and wherein the second vertical elastic system comprises an upper-lower reverse preloaded tension spring set, which is arranged in the vertical direction and is respectively connected with the tops and bottoms of the hollow heavy-object supporting plate and the axle frame.

7. The method for applying frequency resonance to electric power generation implemented by using the kinetic energy of a vehicle according to claim 6, wherein positions of upper and lower preloaded tension springs connected with the hollow heavy-object supporting plate are positions on the hollow heavy-object supporting plate, and are separately supported by the first vertical elastic system arranged on the sprung vehicle body so as to achieve a stationary state.

8. The method for applying frequency resonance to electric power generation implemented by using the kinetic energy of a vehicle according to claim 1,
wherein multiple gears are arranged on the center shaft of the generator,
wherein a number of the spur racks is a same as that of the gear, and
wherein the spur racks are oppositely arranged at a certain interval, and respectively unilaterally meshed with corresponding gears.

9. The method for applying frequency resonance to electric power generation implemented by using the kinetic energy of a vehicle according to claim 1, wherein the center shaft of the generator is also provided with a speed increaser.

10. A structure for generating electric power by using kinetic energy of a vehicle through application of the method according to claim 1, the structure comprising:
the sprung vehicle body provided with the first vertical elastic system; and
the hollow heavy-object supporting plate supported by the sprung vehicle body that is provided with the second vertical elastic system, and is equipped with the kinetic energy generator.

11. The structure for generating electric power by using the kinetic energy of a vehicle according to claim 10,
wherein a bottom of the axle frame is fixedly arranged on an axle of the vehicle, and is supported by the axle of the vehicle,
wherein an optical axis, which is perpendicular to the ground and used for guiding, is arranged between the top surface and bottom surface of the axle frame, and
wherein the hollow heavy-object supporting plate is sleeved on the optical axis by a linear bearing, and vibrates upwards and downwards along the vertical direction of the optical axis so as to absorb the kinetic energy of vibration of the sprung vehicle body.

12. The structure for generating electric power by using the kinetic energy of a vehicle according to claim 10,
wherein a number of the spur rack is a same as that of the gears, and
wherein the spur racks are oppositely arranged at a certain interval.

13. The structure for generating electric power by using the kinetic energy of a vehicle according to claim 10, wherein the first vertical elastic system corresponding to the inherent frequency of the sprung vehicle body is arranged between the axle frame and the sprung vehicle body and an upper-lower reverse preloaded tension spring set, which is arranged in a vertical direction and is respectively connected with tops and bottoms of the hollow heavy-object supporting plate and the axle frame.

14. The structure for generating electric power by using the kinetic energy of a vehicle according to claim 13, wherein the first vertical elastic system used for supporting and arranged between the axle frame and the sprung vehicle body comprises an air spring arranged between the axle and the sprung vehicle body.

15. The structure for generating electric power by using the kinetic energy of as vehicle according to claim 13,
wherein the upper-lower reverse preloaded tension spring set arranged in the vertical direction comprises an upper tension spring and a lower tension spring,
wherein the upper tension spring is connected with the tops of the hollow heavy-object supporting plate and the axle frame,
wherein the lower tension spring is connected with the bottoms of the hollow heavy-object supporting plate and the axle frame,
wherein the upper tension spring and the lower tension spring are connected by a vertical mesh rack,
wherein the vertical mesh rack is meshed with a lateral mesh rack, and
wherein the lateral mesh rack is vertically fixed on the side face of the hollow heavy-object supporting plate.

16. The structure for generating electric power by using the kinetic energy of a vehicle according to claim 13, wherein the upper-lower reverse preloaded tension spring set of the hollow heavy-object supporting plate and the upper-lower reverse preloaded tension spring set of the sprung vehicle body are the same one.

17. The structure for generating electric power by using the kinetic energy of a vehicle according to claim 10,
wherein the second vertical elastic system of the hollow heavy-object supporting plate is arranged on the sprung vehicle body and is used for separately supporting a gravity of the hollow heavy-object supporting plate, and
herein the second vertical elastic system comprises an upper-lower reverse preloaded tension spring set, which is arranged in the vertical direction and is respectively connected with the tops and bottoms of the hollow heavy-object supporting plate and the axle frame.

18. The structure for generating electric power by using the kinetic energy of a vehicle according to claim 17, wherein the second vertical elastic system arranged on the sprung vehicle body and used for separately supporting the gravity of the hollow heavy-object supporting plate adopts a support spring arranged on the sprung vehicle body.

19. The structure for generating electric power by using the kinetic energy of a vehicle according to claim 17,
wherein the second vertical elastic system arranged on the sprung vehicle body and used for separately supporting the gravity of the hollow heavy-object supporting plate adopts a support box arranged on the sprung vehicle body and formed by vertical support frames, and
wherein the top end of the support box and the hollow heavy-object supporting plate are connected in suspended connection mode by using a tension spring.

* * * * *